(12) United States Patent
Ding (10) Patent No.: US 11,940,307 B2
(45) Date of Patent: Mar. 26, 2024

(54) METHODS AND APPARATUS FOR PRESSURE BASED MASS FLOW RATIO CONTROL

(71) Applicant: MKS Instruments, Inc., Andover, MA (US)

(72) Inventor: Junhua Ding, Boxborough, MA (US)

(73) Assignee: MKS Instruments, Inc., Andover, MA (US)

( * ) Notice: Subject to any disclaimer, the term of this patent is extended or adjusted under 35 U.S.C. 154(b) by 52 days.

(21) Appl. No.: 17/342,341

(22) Filed: Jun. 8, 2021

(65) Prior Publication Data

US 2022/0390261 A1 Dec. 8, 2022

(51) Int. Cl.
*G01F 1/86* (2006.01)
*G01F 1/37* (2006.01)
*G05D 7/06* (2006.01)

(52) U.S. Cl.
CPC .............. *G01F 1/372* (2013.01); *G01F 1/86* (2013.01); *G05D 7/0652* (2013.01)

(58) Field of Classification Search
CPC ..... G01F 1/34; G01F 1/36; G01F 1/38; G01F 1/86
See application file for complete search history.

(56) References Cited

U.S. PATENT DOCUMENTS

| | | | |
|---|---|---|---|
| 3,838,598 A | 10/1974 | Tompkins | |
| 5,837,903 A | 11/1998 | Weigand | |
| 6,182,019 B1 | 1/2001 | Wiklund | |
| 7,143,774 B2 | 12/2006 | Lull et al. | |
| 7,874,208 B2 | 1/2011 | Redemann et al. | |
| 8,068,999 B2 | 11/2011 | Wang et al. | |
| 8,132,464 B2 | 3/2012 | Broden et al. | |
| 8,197,133 B2 | 6/2012 | Schultz et al. | |
| 8,504,318 B2 | 8/2013 | Mendelson et al. | |
| 8,752,433 B2 | 6/2014 | Hedtke | |
| 8,887,549 B2 | 11/2014 | Mendelson et al. | |
| 9,146,563 B2 | 9/2015 | Smirnov | |
| 9,562,796 B2 | 2/2017 | Lull | |
| 11,073,846 B2 | 7/2021 | Lull et al. | |
| 2002/0092564 A1 | 7/2002 | Ollivier | |
| 2004/0119038 A1 | 6/2004 | Crockett et al. | |
| 2005/0199342 A1 | 9/2005 | Shajii et al. | |

(Continued)

FOREIGN PATENT DOCUMENTS

| | | |
|---|---|---|
| JP | 2015-099569 A | 5/2015 |
| KR | 10-2000-0056692 A | 9/2000 |
| WO | 2021173363 A1 | 9/2021 |

OTHER PUBLICATIONS

Flow Measurement with LFEs, Laminar Flow Elements, TetraTec Instruments GmbH, 2 pages (2018).

(Continued)

*Primary Examiner* — Erika J. Villaluna
(74) *Attorney, Agent, or Firm* — Hamilton, Brook, Smith & Reynolds, P.C.

(57) ABSTRACT

A system and method for dividing a single mass flow into secondary flows of desired ratios to total flow. Each secondary flow line includes a pressure drop element, an absolute pressure sensor and a differential pressure sensor. The nonlinear relationship between flow and pressures can be transformed into a function of the absolute and differential pressures that has a linear relationship with the flow.

20 Claims, 7 Drawing Sheets

(56) References Cited

U.S. PATENT DOCUMENTS

| | | |
|---|---|---|
| 2011/0191038 A1 | 8/2011 | Lull |
| 2014/0190579 A1 | 7/2014 | Ding |
| 2014/0324323 A1 | 10/2014 | Gates et al. |
| 2019/0204857 A1 | 7/2019 | Yasuda et al. |
| 2019/0339725 A1* | 11/2019 | Ding ........................ G01F 1/50 |
| 2020/0033896 A1 | 1/2020 | Tseng et al. |
| 2021/0263541 A1 | 8/2021 | Ding |
| 2021/0318698 A1 | 10/2021 | Lull et al. |
| 2022/0082415 A1* | 3/2022 | Yuuki ..................... G01F 1/363 |

OTHER PUBLICATIONS

MKS Instruments, Inc. Data Sheet, "DLT2A2—Flow Ratio Controller Process Optimization Through Precise Flow Ratio Control," Flow Solutions, Delta II DeviceNet, 2005, 4 pages.

MKS Instruments, Inc. Data Sheet, "DLT3B—3 Zone Flow Ratio Controller Enabling Process Optimization for Critical Deposition and Etch Processes," Flow Solutions, Delta III EtherCAT, 2007, 4 pages.

MKS Instruments, Inc. Data Sheet, "DLTNA4—4 Zone Flow Ratio Controller Enabling Process Optimization for Critical Deposition and Etch Processes," Flow Solutions, Delta IV DeviceNet, 2007, 4 pages.

International Search Report and Written Opinion, issued in PCT/US2021/017657, entitled "Methods and Apparatus for Pressure Based Mass Flow Ratio Control," 12 pages, dated May 3, 2021.

https://experience.brooksinstrument.com/pressure-based-mass-flow-controller-gp200.

https://www.brooksinstrument.com/en/about-us/news/2019/gp200-pressure-based-mfc-debuts Data Sheet; 2021.

Notice of Allowance for U.S. Appl. No. 16/800,363, dated Sep. 17, 2021.

Notification of Transmittal of the International Search Report and the Written Opinion of the International Searching Authority, or the Declaration issued for International Application No. PCT/US2022/072774, entitled "Methods and Apparatus for Pressure Based Mass Flow Ratio Control," dated Jun. 6, 2022.

* cited by examiner

METHODS AND APPARATUS FOR PRESSURE BASED MASS FLOW RATIO CONTROL

BACKGROUND

The fabrication of semiconductor devices often requires the careful synchronization and precisely measured delivery of as many as a dozen gases to a processing tool, such as a vacuum chamber. Various recipes are used in the fabrication process, and many discrete processing steps, where a semiconductor device is cleaned, polished, oxidized, masked, etched, doped, metalized, etc., can be required. The steps used, their particular sequence, and the materials involved all contribute to the making of particular devices.

Accordingly, wafer fabrication facilities are commonly organized to include areas in which chemical vapor deposition, plasma deposition, plasma etchings, sputtering, and other similar gas manufacturing processes are carried out. The processing tools, e.g. chemical vapor deposition reactors, vacuum sputtering machines, plasma etchers, or plasma enhanced chemical vapor deposition, must be supplied with various process gases. Pure gases must be supplied to the tools in contaminate-free, precisely metered quantities.

In a typical wafer fabrication facility, the gases are stored in tanks, which are connected via piping or conduits to a gas box. The gas box delivers contaminant-free, precisely metered quantities of pure inert or reactant gases from the tanks of the fabrication facility to a process tool. The gas box, or gas metering system includes a plurality of gas paths having gas metering units, such as valves, pressure regulators and transducers, mass flow controllers, and filters/purifiers. Each gas path has its own inlet for connection to a separate source of gas, but all the gas paths converge into a single outlet for connection to the process tool.

Dividing the combined process gases among multiple process chambers or other destinations may be desired. In such cases, the single outlet of the gas box is connected to multiple locations through secondary flow paths (lines or channels). Flow Ratio Controllers (FRCs) are used to measure and control the relative ratio of secondary flows in the secondary flow lines and ensure the precise delivery of fluids to the process chambers with secondary flows of known precise values.

Thermal flow sensors have been used in mass flow ratio control (FRC) for many years due to linear sensor response and low pressure drop characteristics. However, thermal flow sensors are prone to zero drift. Further, in certain applications, chemical reactions may change the capillary thermal sensor tube surface of the sensor and cause sensor drift.

A pressure-based flow ratio control (PBFRC) has been presented in U.S. Pat. No. 10,698,426. In that system, the thermal flow sensors were replaced by pressure based sensors that determine flow based on pressure sensed upstream and downstream of a flow restrictor. To reduce the number of the pressure sensors, a common pressure sensor was shared at the inlet of the FRC, and the pressure adjacent to and just upstream of each flow restrictor was computed from that shared sensed pressure through a recursive calculation. Flow rate was computed from that upstream pressure and the sensed downstream pressure.

SUMMARY

Pressure based flow sensors overcome the issues presented by thermal flow sensors but they present their own issues. The relationship between pressure sensor signal and flow rate can be highly nonlinear and thus requires knowledge of the gas properties when used in flow ratio control applications. To overcome that difficulty, the pressure drop element (flow restrictor) in each flow sensor can be configured to create a linear response between the secondary flow rate of each line and a function of the upstream pressure and the downstream pressure. To that end, a laminar flow element may be chosen.

Another difficulty unique to the FRC application is that the pressure differential across the pressure drop element can be very low, and it can be in the error band of absolute pressure sensors, that is, 1% of the pressure readings. Low differential pressure can be exacerbated by the laminar flow pressure drop element. To overcome that problem, one of the pressure sensors in each flow line is replaced by a differential pressure sensing element in communication with the pressures upstream and downstream of the pressure drop element. The differential pressure sensor provides more accuracy than absolute pressure sensors for small differential pressure measurements, and that accuracy is independent of the absolute pressure. A single differential pressure measurement is much less likely to fall within an error range than the pressure difference obtained by two absolute pressure sensors. In combination with a single absolute pressure sensor, the differential pressure sensor provides a much more accurate flow measurement, particularly with low pressure drop conditions.

A system for dividing mass flow into secondary flows comprises an inlet configured to receive an inlet flow and secondary flow lines connected to the inlet. Each secondary flow line includes a flow path configured to carry a secondary flow with a secondary flow rate, a pressure drop element in the flow path, and a valve configured to control the secondary flow rate based on a control signal. Flow rate in each secondary flow line is sensed by a pressure sensor, configured to provide a pressure signal representative of pressure at the pressure drop element, and a differential pressure sensing element in communication with pressures upstream and downstream of the pressure drop element, configured to provide a differential pressure signal representative of differential pressure across the pressure drop element. A controller is configured to calculate a secondary flow rate of each secondary flow line based upon the pressure signal and the differential pressure signal and is further configured to generate the control signal to each valve to obtain a desired ratio of secondary flow rate to total flow rate.

Each differential pressure element may comprise a diaphragm exposed at one face to the pressure upstream of the pressure drop element and exposed on an opposite face to the pressure downstream of the pressure drop element.

In one configuration, the pressure sensor is upstream of the pressure drop element and the valve is downstream of the pressure drop element in each secondary flow line. The upstream pressure sensor of each flow line may be a common pressure sensor shared by all secondary flow lines.

In other configurations, the valve is positioned upstream of the pressure drop element. The pressure sensor may be positioned either between the valve and the pressure drop element or downstream of the pressure drop element.

The pressure drop element may be configured to create a linear response between the secondary flow rate and a function of the pressure at the pressure drop element and the differential pressure across the pressure drop element. To that end, the pressure drop element may be a laminar flow element.

A temperature sensor configured to measure the temperature of the fluid in each secondary flow line may be provided in each flow line, or a common temperature sensor may be provided.

The controller may be configured to compute and control the ratio of each secondary flow rate according to the relationship $$r_i = \frac{Q_i}{Q_t} = \frac{Q_i}{\sum_{j=1}^{N} Q_j} = \frac{k_i * (2P_{u,i} - DP_i) * DP_i}{\sum_{j=1}^{N} k_j * (2P_{u,j} - DP_j) * DP_j}, i = 1, 2, \ldots N.$$

In a method of dividing mass flow into secondary flows, the controller determines the secondary flow rate of each flow line based upon the pressure signal and the differential pressure signal, and the controller generates and applies the control signals to each valve to obtain a desired ratio of secondary flow rate to total flow rate.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

One use of the devices, systems, and methods disclosed is for gas metering systems for delivering contaminant-free, precisely metered quantities of process and purge gases to semiconductor processing tools, chambers, and/or other systems, apparatus and devices. The presently disclosed devices, systems, and methods provide the benefit of operating without disturbing the performance of any upstream mass flow controllers. The presently disclosed devices, systems, and methods provide the benefit of allowing for a single mass flow to be divided into secondary flows of desired ratios using pressure sensors. The devices, systems, and methods provide the benefit of dividing a single flow of gas or liquid into multiple secondary flows of known, precise relative values of desired ratios without requiring either a relatively high upstream pressure or knowledge of gas or gasses that comprise the flows.

Figure 1:
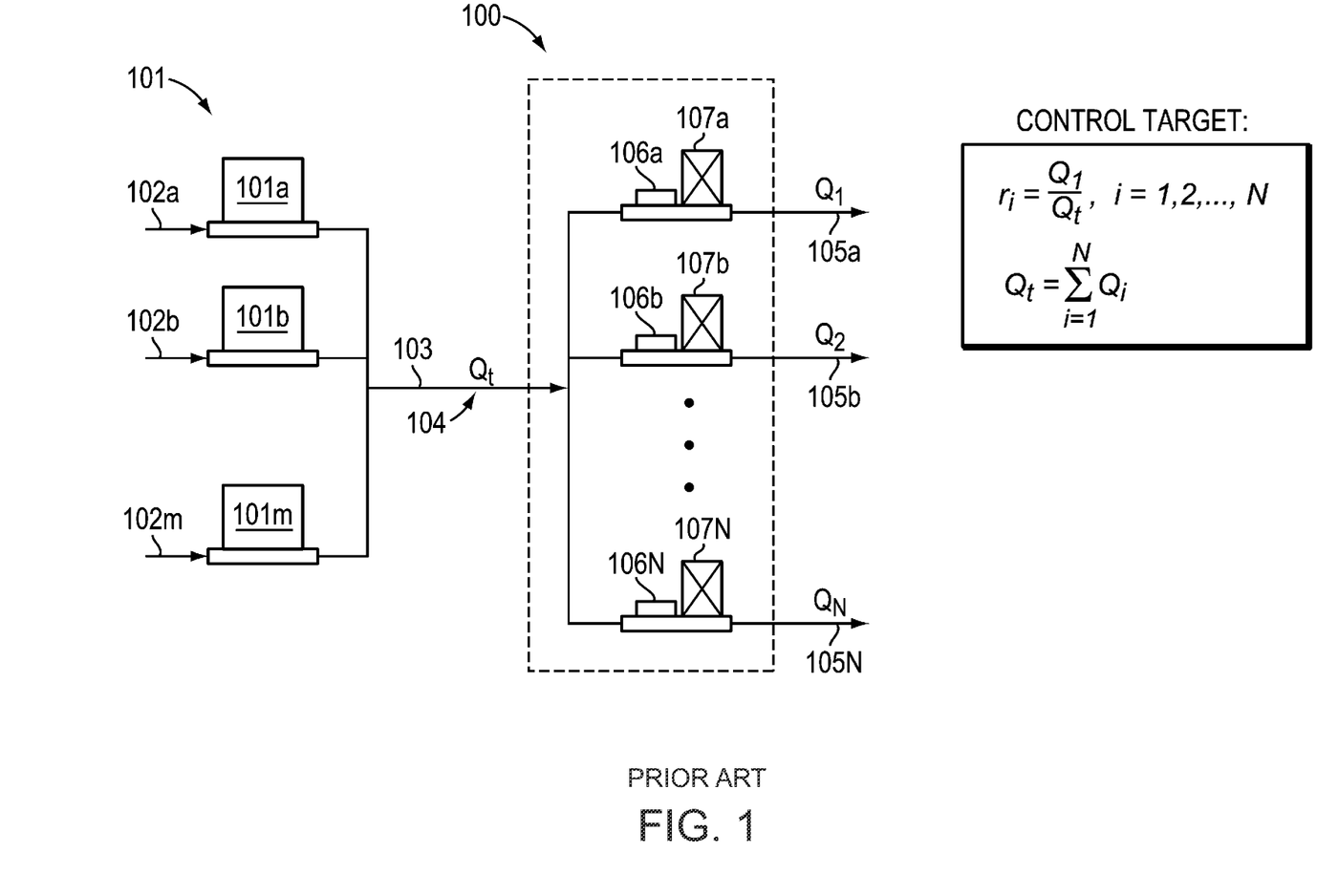
FIG. 1 is a schematic illustrating a prior art thermal flow ratio controller that receives a single mass flow from a set of mass flow controllers.

FIG. 1 is a schematic illustration of a prior art flow ratio controller 100 that relies on thermal flow sensors. It receives a single mass flow 103 from a set of mass flow controllers 101 shown for comparison. The set of mass flow controllers 101 control the flow of fluids 102 into an inlet line or manifold 104 of flow ratio controller 100. The fluids may be a mixture, including both process gases and a purge gas drawn from existing gas storage devices such as gas tanks. Although not shown, fluids 102 may be monitored or controlled by additional components such as filters, purifiers, and pressure transducers and controllers. The mass flow 102 forms an inlet flow 103 that is received by inlet 104. In other embodiments, the inlet flow is comprised of a single fluid 102 received from a single mass flow controller, a gas storage container, or other source. The inlet flow travels in inlet 104 at flow rate $Q_t$. The amount of gases 102 and mass flow controllers 101 can be variable. Gases 102 may originate from any potential source or gas storage device. Even if the properties of the individual gases 102 are known, the properties of mixture 103 and inlet flow rate $Q_t$ may be unknown due to different processing recipes.

The inlet 104 is connected to secondary flow lines 105a, 105b, . . . , 105N. The inlet flow is divided into secondary flows. The secondary flows travel within flow paths of the secondary flow lines 105 at secondary flow rates $Q_1$, $Q_2$, . . . , $Q_N$. The flow ratio controller may have any number secondary flow lines and secondary flows depending upon the needs of the system it operates within. The sum of the secondary flow rates $Q_1$, $Q_2$, . . . , $Q_N$ within the secondary flow lines 105 must be equal to inlet flow rate Q as expressed in the equation:

$$\Sigma_{i=1}^{N} Q_i = Qt.$$

The ratio between each secondary flow rate $Q_1$, $Q_2$, . . . , $Q_N$ and the inlet flow rate $Q_t$ can be defined by the equation:

$$r_i = \frac{Q_i}{Q_t}$$

wherein r is the flow ratio of secondary flow line i. Once the ratios between secondary flow rates $Q_1$, $Q_2$, . . . , $Q_N$ and the inlet flow rate $Q_t$ can be determined, they can be accurately controlled. The ratio of secondary flows is determined based on signals provided by flow sensors 106 on each secondary flow line 105 that provide signals indicative of the measured secondary flows.

The secondary flows can be controlled by valves 107 located on each secondary flow line 105. A controller is programed to receive the signals provided by flow sensors 106, determine the current ratio of secondary flows and send a control signal to at least one of the valves 107 causing them to alter the secondary flows in secondary flow lines 105 to obtain desired ratios of secondary flows. The controller may be programmed to receive desired ratios of secondary flow rates, i.e. mass flow ratio setpoints ($r_{spi}$, i=1, 2 . . . N), from a host controller or through a user interface.

The controller is programmed to receive the signals indicative of measured secondary flows provided by flow sensors 106 and calculate the flow ratios of the secondary flows in the secondary flow lines. The controller is also programmed to calculate control signals based on the difference between the calculated ratios of secondary flows and the desired ratios of secondary flows using a feedback control algorithm such as PID or other feedback control algorithm. The controller is also programmed to send the calculated control signals to at least one of the valves 107. The control signals instruct at least one the valves 107 to adjust at least one secondary flows. The controller, by sending a control signal to at least one of the valves 107, adjusts the secondary flow through at least one of the secondary flow lines 105 until the actual ratios of secondary flows equal the desired ratios of secondary flows.

If there is no prior knowledge about the fluid, or mixture of fluids, received by inlet 104 that comprise the inlet mass flow, to calculate the flow ratios, the relationship between the signals of flow sensors 106 and the secondary flows they monitor needs to be linear. A linear function, f(x), has the following properties: $f(k*x)=k*f(x)$ and $f(x1+x2)=f(x1)+f(x2)$ where k is a constant. These properties are essential to the mathematical calculations used to isolate and calculate the secondary flow ratios without knowledge of the properties of fluid 103.

If $Q_1=f1(x1)$ where $Q_1$ is the flow rate of the secondary flows in secondary flow line 105a and f1(x1) is a linear function of the signal x1 provided by flow sensor 106a and if $Q_2=f2(x2)$ where $Q_2$ is the flow rate of the secondary flows in secondary flow line 105b and f2(x2) is a different linear function of the signal x2 of flow sensor 106b the ratio r between the two secondary flow rates $Q_1$ and $Q_2$ may be expressed as the follow equation:

$$r = \frac{Q_1}{Q_2} = \frac{f1(x1)}{f2(x2)}$$

Because of the linear properties of the functions f1(x1) and f2(x2), the above equation can be transformed as follows:

$$r = \frac{f1(x1)}{f2(x2)} = \frac{f1(y1*x0)}{f2(y2*x0)} = \frac{y1*f1(x0)}{y2*f2(x0)} = \frac{y1}{y2}*k0$$

where x0 is a constant therefore $$k0 = \frac{f1(x0)}{f2(x0)}$$

is a constant. y1=x1/x0 and y2=x2/x0 are transformed sensor signals. Functions $f1(x0)$ and $f2(x0)$ both include the same variables based upon fluid properties. Because function $f1(x0)$ is divided by function $f2(x0)$ to create k0, the variables based upon unknown fluid properties found in functions $f1(x0)$ and $f2(x0)$ cancel out and are no longer required to calculate the flow ratio, r. Therefore, the flow ratio $$\frac{Q_1}{Q_2}$$

is equivalent to the ratio of the transformed sensor signals $$\frac{y1}{y2}.$$

This relationship allows tor the determination of the ratio of secondary flow rates based upon the signals provided by flow sensors 106. The ratio of secondary flow rates can be determined even if there is no prior information about the gas or fluid 103 within inlet 104 and/or inlet flow rate $Q_r$.

In flow ratio controllers, such as the one depicted in FIG. 1, the mathematical limitations of the transformation used to determine the ratio of secondary flow rates require the use of flow sensors 106 with a linear response between the signal of the flow sensors 106 and the flow they measure within the secondary flow lines 105. The thermal flow sensors typically used in flow ratio controllers have such a linear response.

Thermal flow sensors have a sensor output that is related by a linear function to flow rate measured. Additionally, thermal flow sensors have a low pressure drop which is of benefit in certain situations requiring flow ratio control. However, there are drawbacks in using thermal flow sensors. Specifically, thermal flow sensors experience a long-term drift in their measurements that introduces inaccuracies into a flow ratio controller that uses thermal flow sensors. Also, the high temperatures of a thermal flow sensor can cause undesirable chemical reactions if used in combination with certain reactive gas species such as HBr and Cl2. This reaction may further decrease thermal sensor accuracy.

Pressure based mass flow measurement techniques and sensors provide an alternative to thermal based mass flow sensors. A typical pressure based flow sensor has absolute pressure sensors upstream and downstream of a flow restrictor. A flow ratio controller that uses pressure sensors may have better performance than existing thermal based flow ratio controllers in terms of zero drift, corrosive resistance, and high temperature capability. However, the pressure based mass flow measurements usually have a highly nonlinear relationship between the pressure sensor output and flow rate. This relationship can be extremely complex and include fluid properties as important variables. For example, the flow rate (Q) for a nozzle in un-choked flow conditions is determined by the following equation:

$$Q = C' * A * Pu * \left(\frac{R*T}{M} * \frac{2\gamma}{\gamma-1}\right)^{\frac{1}{2}} * \left(\frac{Pd}{Pu}\right)^{\frac{1}{\gamma}} * \left(1 - \frac{Pd}{Pu}^{\frac{\gamma-1}{\gamma}}\right)^{\frac{1}{2}}$$

where C' is the discharge coefficients, A is the throat area of the nozzle, Pu is the pressure upstream of the nozzle, Pd is the pressure downstream of the nozzle, R is the universal gas constant, T is the fluid temperature, M is the fluid molecular weight, and $\gamma$ is the ratio of specific heats of the gas. Because of these and other highly nonlinear relationships, fluid properties are generally required to directly determine flow ratios using measurements from pressure sensors. However, if a pressure drop element, such as a laminar flow element, is placed in each line carrying a flow, it creates a new relationship between the pressure upstream of the element, the pressure downstream of the element, and the flow.

In mass flow ratio control applications, the gas properties of the inlet flow may not be known to the flow ratio controller. These properties include but are not limited to the gas specific heat, the gas molecular weight, and the gas viscosity which are necessary to determine the absolute secondary flow rate in each of secondary flow channels. The inlet mass flow may also be comprised of an unknown mixture of at least two components.

The secondary flow rates may be determined in general by the following equation:

$$Q = f(\epsilon, d, L, mw, r, \mu, T, Pu, Pd)$$

where $Q$ is the secondary flow rate and $f(\ )$ is a function of dimensions of the pressure drop element ($\in$, d, L), fluid properties (mw, r, µ), fluid temperature (T), the upstream pressure (Pu) and the downstream pressure (Pd). For laminar flow elements, the function $f(\ )$ can have the form of:

$$Q = f(\in, d, L, mw, r, \mu, T, Pu, Pd) = k(\in, d, L, mw, r, \mu, T) * (Pu^2 - Pd^2)$$

where $k(\ )$ is a function without the pressures, i.e Pu & Pd. In other words, the effect of the upstream pressure and the downstream pressure on the flow rate $Q$ can be separated from other factors.

Figure 2:
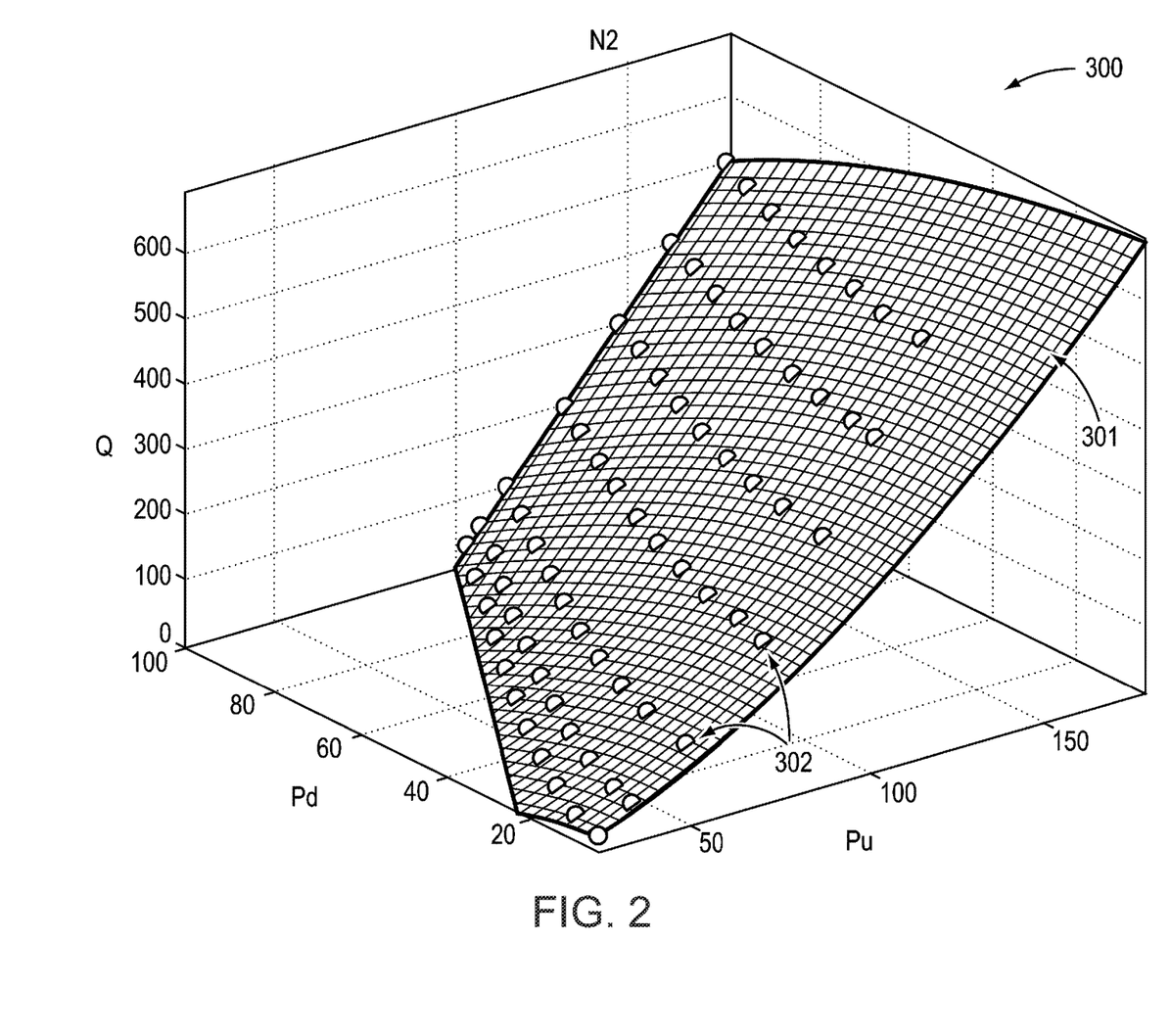
FIG. 2 is a three-dimensional graph illustrating the relationship between the upstream pressure, downstream pressure, and flow for the gas N2 in a channel with a laminar flow element.

FIG. 2 is a three-dimensional graph 300 illustrating the relationship 301 between the upstream pressure, downstream pressure, and flow for the gas N2 in a channel with a laminar flow element. Graph 300 displays the relationship 301 between the pressure upstream from the element Pu, the pressure downstream of the element Pd, and the flow rate within the channel Q and includes specific data points 302. The relationship 301 between Q, Pu, and Pd is still highly nonlinear:

$$Q = k(\in, d, L, mw, r, \mu, T) * (Pu^2 - Pd^2)$$

where $k(\in, d, L, mw, r, \mu, T)$ is a function dependent upon the geometry of the laminar flow element ($\in$, d, L) fluid properties (mw, r, µ) and gas temperature T. For the function $k(\in, d, L, mw, r, \mu, T)$, $\in$ is the porosity of the laminar flow element if it is porous media, d is the inner diameter of an annulus bypass or bundled tubes laminar flow element, and L is the length of the laminar flow element. However, all of the variables of $k(\ )$ can be kept constant across secondary flow lines of a flow ratio controller; therefore, $k(\ )$ can be treated as a mathematical constant, assuming the gas temperature is fixed. If $k(\ )$ is a constant, the flow rate in a channel that has a laminar flow element is linearly related to the difference between the square of the pressure upstream from the element and the square of the pressure downstream of the element. Using the following example vector transformation sequence, it is possible to derive a vector variable from the two pressures, Pu and Pd, that is linearly related to flow, Q. The two vectors can be defined as follows:

(1) The Modified Pressure Vector $\vec{x}$ $$\vec{x} = [x1, x2]' = [Pu^2, Pd^2]'$$

which is a column vector comprised of the upstream pressure and downstream pressure scalar variables where [ ]' is the vector transpose operator, and (2) The Transformation Vector $\vec{K}$ $$\vec{K} = [k(\in, d, L, mw, r, \mu, T), -k(\in, d, L, mw, r, \mu, T)]$$

which is a row vector of the scalar constant function $k(\in, d, L, mw, r, \mu, T)$. The relationship between Q, Pu and Pd can be rewritten using the using the above two vectors as $$Q = k(\in, d, L, mw, r, \mu, T) * (Pu^2 - Pd^2)$$

$$Q = [k(\in, d, L, mw, r, \mu, T), -k(\in, d, L, mw, r, \mu, T)] \cdot [Pu^2, Pd^2]'$$

$$Q = \vec{K} \cdot \vec{X}$$

where $\cdot$ is the dot product operator for a matrix/vector. The rewritten flow rate $Q$ has a linear relationship with the modified pressure vector $\vec{X}$ which is derived from the upstream pressure Pu and the downstream pressure Pd for each of the secondary flow channels. In other words, using a laminar flow element as a pressure drop element in a pressure based flow ratio controller provides a linear response between the flow rate Q and the modified pressure vector variable $\vec{X}$. This allows for mass flow ratio control for an unknown inlet fluid.

The above equation can be expanded as follows:

$$Q = k(Pu^2 - Pd^2) = 2k * \frac{(Pu + Pd)}{2} * (Pu - Pd)$$

From this form, it can be seen that, for a given flow, as the average pressure (Pu+Pd)/2 increases, the pressure drop (Pu−Pd) across the restrictor decreases. The situation can occur, for example, where one channel has a low ratio set point relative to other channels. High flow through the other channels may result in a high inlet pressure and thus a high average pressure in all channels; the low flow through the low set point channel results in very small pressure drop.

The small pressure drop creates a problem for flow measurement using two absolute pressure sensors. For the low flow and low pressure drop condition, the differential pressure across the pressure drop element (Pu−Pd) can be small and may well be in the error band of the absolute pressure sensors, that is, within 1% of pressure readings. In other words, two absolute pressure sensors may not be able to provide an accurate differential pressure measurement (Pu−Pd) for low flow measurement.

Whether the pressure differential across each flow restrictor in each channel of the flow ratio controller would be sufficient to be accurately measured by the absolute pressure sensors Pu and Pd is largely dependent on the application. Consider the following two cases of a two-channel flow ratio controller.

In the first case, the total inlet flow $Qt=200$ sccm and the ratio setpoint is 1:1. In that case, Q1=Q2=100 sccm. The pressure condition on channel 1 might be (Pu+Pd1)/2=10 Torr and Pu−Pd1=2 Torr. The two Torr pressure differential would exceed the error range of 1% of 10 Torr, so the measurements and control would be acceptable.

In the second case, total inlet flow $Qt=1100$ sccm and the ratio set point is 1:10. Q1 would then be controlled to 100 sccm, and Q2 would be controlled to 1000 sccm. The control valve controlling Q2 would be held very open to obtain the 1000 sccm but the high flow rate would result in a large pressure drop and thus a high upstream pressure Pu. The valve in channel 1 would be held near closed to minimize flow from the high upstream pressure. As a result, the condition in channel 1 might be an average pressure (Pu+Pu1)/2=100 Torr and a pressure differential Pu−Pd1=0.2 Torr. The 0.2 Torr pressure differential is substantially less than 1% of the average pressure and of the pressure of the upstream pressure sensor. Thus, the two absolute pressure sensors would not be able to provide the accurate differential pressure Pu−Pd1 for accurate flow ratio control.

To overcome the problem of low differential pressure, one of the absolute pressure sensors is replaced with a differential pressure sensor. The ratio calculation formulas can then be presented as follows:

For two absolute pressure sensors, i.e. Pu and Pd:

$$\text{Flow } i: Q_i = k_i * (P_{u,i}^2 - P_{d,i}^2) = k_i * (P_{u,i} + P_{d,i}) * (P_{u,i} - P_{d,i}) \quad i = 1, 2, \ldots N$$

$$\text{Flow Ratio } i: r_i = \frac{Q_i}{Q_t} = \frac{Q_i}{\sum_{j=1}^{N} Q_j} = \frac{k_i * (P_{u,i}^2 - P_{d,i}^2)}{\sum_{j=1}^{N} (kj * (P_{u,j}^2 - P_{d,j}^2))} \quad i = 1, 2, \ldots N$$

where $k_i$ is a function of gas properties and characteristic of the pressure drop element for the flow channel I, and $Q_t$ is the total flow as $Q_t = \Sigma_{j=1}^{N} Q_j$.

Figure 3:
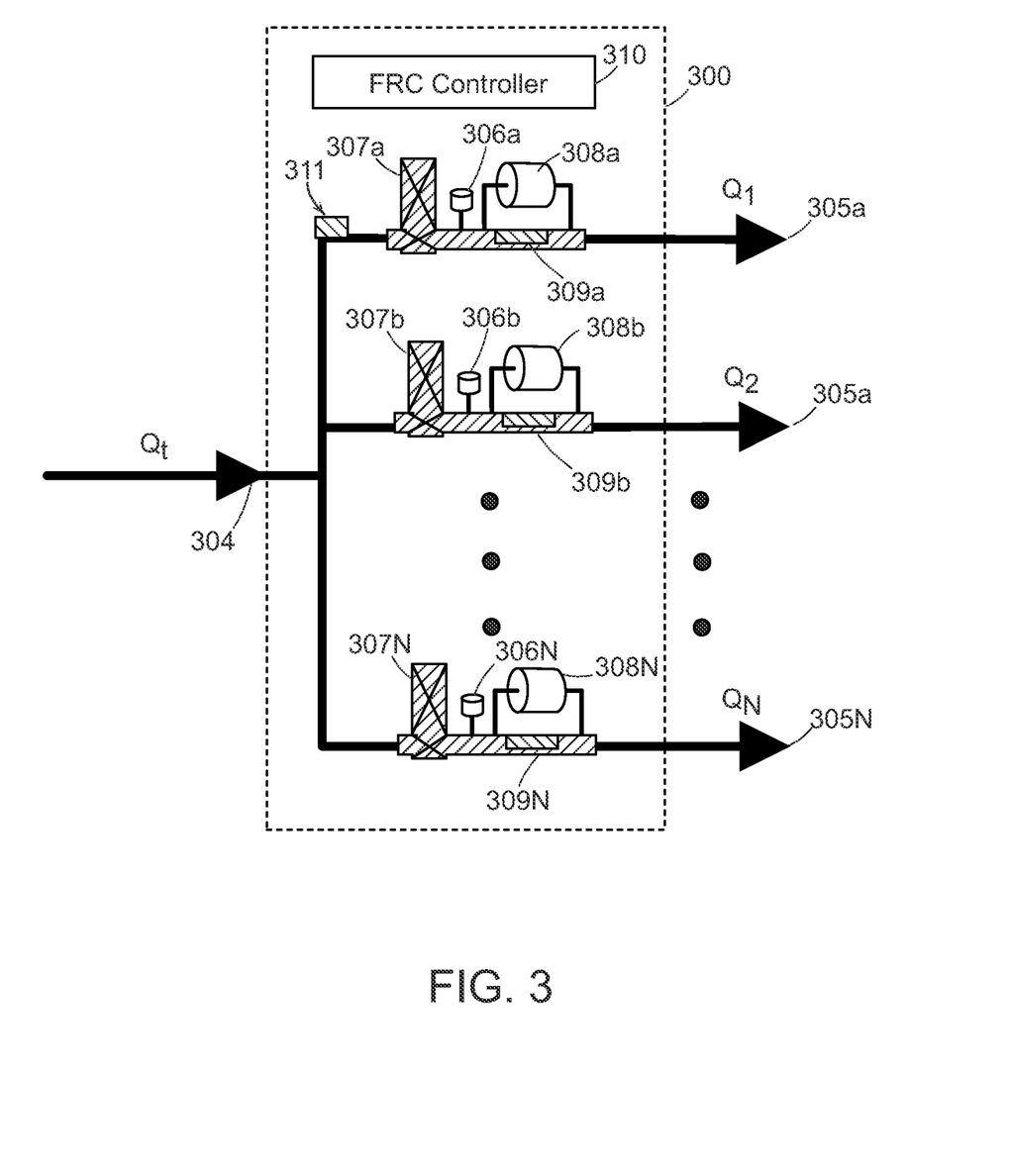
FIG. 3 is a schematic illustration of an example embodiment of a pressure based flow ratio controller.

For one absolute pressure sensor and one differential pressure sensor, i.e. Pu and DP, substituting $(P_{u,i} - DP_i)$ for $P_{d,i}$:

Flow $i$: $Q_i = k_i * (P_{u,i}^2 - P_{d,i}^2) = k_i * (2P_{u,i} - DP_i) * DP_i, i = 1, 2, \ldots N$ Flow Ratio $i$: $r_i = \dfrac{Q_i}{Q_t} = \dfrac{Q_i}{\sum_{j=1}^{N} Q_j} = \dfrac{k_i * (2P_{u,i} - DP_i) * DP_i}{\sum_{j=1}^{N} k_j * (2P_{u,j} - DP_j) * DP_j}$, $i = 1, 2, \ldots N$ FIG. 3 is a schematic illustrating an example embodiment of a pressure based flow ratio controller 300 in which each upstream and downstream absolute pressure sensor is replaced with an upstream absolute sensor and a differential sensor. The flow ratio controller 300 in FIG. 3 can be part of a multi-channel gas delivery, and selectively receives individual or mixtures of multiple gases, including for example process gases and a purge gas from gas suppliers (e.g., gas tanks). The flow ratio controller 300 is configured to receive pressure signals from pressure sensors 306 and pressure differential sensors 308 to determine and precisely control the ratio of the secondary flows through the secondary flow lines 305. Each differential sensor is connected across a laminar flow element 309. Such a sensor typically includes a diaphragm exposed on opposite faces to gas pressure to which the two ports are connected. The flow ratio controller 300 may be configured to obtain the gas temperature signal from temperature sensor 311. Temperature sensor 311 is configured to provide a gas temperature signal representative of the temperature of the inlet flow. In alternative embodiments, a temperature sensor 311 may be located on each of the secondary flow lines 305. The provided temperature signal(s) can be used to normalize $k(\in, d, L, mw, r, \mu, T)$ and in the calibration process of flow ratio controller 300.

The flow ratio controller 300 and associated method provide the benefit of dividing a single mass flow of gas or liquid into multiple secondary flows of known, precise relative values and with desired ratios of secondary flows without requiring a relatively high upstream pressure and without requiring knowledge of gas properties. The pressure sensor 306 and differential pressure sensor 308 produce signals that are representative of the pressure measured upstream of and the pressure measured across a pressure drop element 309, respectively.

The inlet 304 is connected to secondary flow lines 305a, 305b, . . . , 305N. The inlet flow of fluid is divided into secondary flows travelling at a flow rates $Q_1, Q_2, \ldots, Q_N$ in the paths of secondary flow lines 305. The inlet flow rate $Q_t$ of the inlet flow within the inlet 304 is equal to the sum of the secondary flow rates $Q_1, Q_2, \ldots, Q_N$ within the secondary flow lines 305: $Q_t = \Sigma_{i=1}^{N} Q_i$. The flow ratio controller may have any number of secondary flow lines 305 depending upon the needs of the system it operates within. The outlets of the secondary flow lines can be connected to an equal number of locations such as processing chambers in only one process tool, or locations in two or more process tools. The outlet of each secondary flow line can be connected to any device or destination required by the system.

Each upstream pressure sensor 306 produces a signal that corresponds with the pressure upstream of the pressure drop element and can be used as the input for the variable Pui for each secondary flow line 305. Each differential pressure sensor 308 produces a signal that corresponds with the differential pressure across the pressure drop element and can be used as the input for the variable DPi for each secondary flow line 305. Therefore, the secondary flow rates $Q_1, Q_2, \ldots, Q_N$ within secondary flow lines 405 are linearly related to the function of pressure signals (2 Pui–DPi)*DPi or the vector $\vec{Xi}=[\text{Pui}, \text{DPi}]'$ as $Qi = ki(\in i, di, Li, mw, r, \mu, T)*(2Pui - DPi)*DPi$ or $Qi = \vec{Ki} \cdot \vec{Xi}, i = 1, 2, \ldots, N$ These linear relationships allow for each ratio among the secondary flow rates $Q_1, Q_2, \ldots, Q_N$ within the secondary flow lines 305 and the inlet flow rate, i.e.

$r_i = \dfrac{Q_i}{Q_t}$, to be determined using the signals provided by pressure sensors 306i and 308i. This is possible even with no prior information about fluid 303, the properties of fluid 303, and the absolute true flow rate $Q_t$ of fluid 303 within inlet 304. Fluid 303 may be a mixture of several component fluids and the component fluids may be known or unknown.

Controller 310 may be a computer, such as a microprocessor, with a memory and processor. Alternatively, controller 310 may be any similar device capable of performing mathematical processes. Controller 310 is programmed to receive the signals provided by upstream pressure sensors 306 and differential sensors 308. Controller 310 is further programmed to use the signals from upstream pressure sensors 306 and differential pressure sensors 308 to derive transformed sensor response vectors $\vec{x}_1, \vec{x}_2, \ldots, \vec{x}_N$ for each secondary flow line 305. The transformed sensor response vectors $\vec{x}_1, \vec{x}_2, \ldots, \vec{x}_N$ each has a linear relationship with the flow rate $Q_1, Q_2, \ldots, Q_N$ of the secondary flows in their secondary flow lines. Controller 310 is configured to use the transformed sensor response vectors $\vec{x}_1, \vec{x}_2, \ldots, \vec{x}_N$ to determine the ratios of the secondary flow rates $Q_1, Q_2, \ldots, Q_N$ of the secondary flows lines 305. Each ratio of secondary flow rates can be determined between the secondary flow rate $Q_1, Q_2, \ldots, Q_N$ of every secondary flow line 305a, 305b, . . . , 305N and the inlet flow rate $Q_t$ where $Q_t = \Sigma_{i=1}^{N} Q_i$.

Each secondary flow line 305 includes a valve 307 configured to control the secondary flow rate $Q_1, Q_2, \ldots, Q_N$ within a secondary flow line 305. Valve 307 may be located upstream or downstream of pressure flow sensors 306 and 308. Controller 310 may be configured to send control signals to control valves 307 in order obtain a target or desired ratio of secondary flows. Controller 310 may be configured to determine the current ratio of secondary flow rates $Q_1, Q_2, \ldots, Q_N$ based on the pressure signals from pressure sensors 306 and 308. Controller 310 may subsequently send a control signal to at least one of the valves 307 and in response to the control signal, the at least one of the valves 307 will alter the secondary flow of its secondary flow line 305. The controller 310, through a feedback loop that includes sending control signals to at least one of the valves 307, adjusts the secondary flow of at least one secondary flow line 305 until the ratios of secondary flow rates equal the desired ratios.

Controller 310 may be configured to receive desired ratios of secondary flow rates or flow rate ratio setpoints. Controller 310 may use any of the disclosed mathematical relationships between secondary flow rates $Q_1, Q_2, \ldots, Q_N$ and signals from pressure sensors 306 and 308 to determine the current secondary flow rates $Q_1, Q_2, \ldots, Q_N$, the current ratio of secondary flow rates, target ratio of secondary flow rates, i.e. mass flow ratio setpoints ($r_{spi}$, i=1, 2, ..., N), the secondary flow rates $Q_1, Q_2, \ldots, Q_N$ that would produce the target ratio of secondary flow rates, and the control signals sent to least one of the valves 307 that would induce the target ratio of secondary flow rates. Controller 310 may include a feedback control module which calculates and sends a control signal to each valve in the secondary flow channels based on the calculated ratio of secondary flow rate and the desired ratio of secondary flow to regulate the flow rate ratio in each of the secondary flow channels to a desired flow rate ratio setpoint. Controller 310 may also be configured to calculate the inlet flow $Q_r$.

Because the flow ratio controller 300 uses an absolute pressure sensor 306 and a differential pressure sensor 308 to measure flow rates and hence the flow rate ratios, it has several advantages over existing thermal mass flow ratio controllers. First, it provides the ability to perform pressure based mass flow ratio control utilizing the linear relationship between the secondary flow rates and the transformed signals of the pressure sensors 306 and 308. Second, pressure based flow sensors are more stable than that of prior art thermal based flow sensors. Pressure based flow sensors are also more corrosive resistant than that of thermal based flow sensors. Furthermore, pressure based flow sensors are more capable for high temperature applications than thermal based flow sensors.

In one embodiment, pressure drop elements 309 are laminar flow elements. Other pressure drop elements 309 besides laminar flow elements may be used in flow ratio controller 300 as long as there is a function equivalent to (2Pu−DP)·DP that has a linear relationship to the secondary flow rate Q. One example alternative is a critical flow nozzle/orifice where the secondary flow is directly linearly related to the pressure upstream of the nozzle. However, the high pressure drop that may be induced by a critical flow nozzle may be a concern from some applications of a flow ratio controller. One benefit of using a laminar flow element as pressure drop elements 309 is that they have a low pressure drop compared to that of a critical flow nozzle/orifice. In fact, even with the laminar flow element, it is best that a low pressure laminar flow range be maintained for high resolution. To that end, the upstream pressure and pressure drop should be sufficiently low to be below the critical flow point to avoid choked flow.

With differential pressure flow sensors, it is generally preferred that the control valve be positioned upstream of the flow restriction and pressure sensors as in FIG. 3 because the configuration results in a larger differential pressure DP for better resolution. It is also best that the absolute pressure sensor be positioned upstream of the restriction to measure the larger pressure Pu rather than downstream of the restriction to measure the lower pressure Pd, although Pd could be measured instead of Pu.

Figure 4:
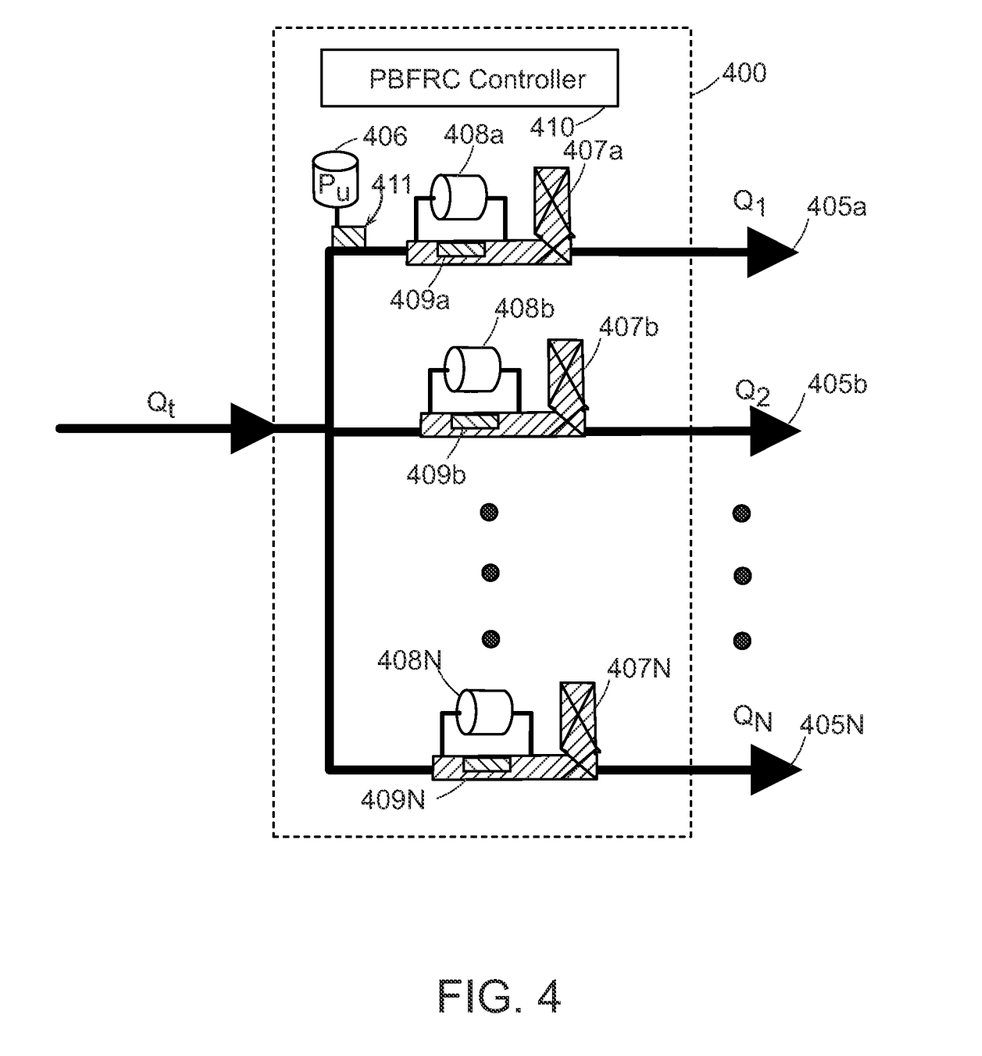
FIG. 4 is a schematic illustration of another embodiment with a shared absolute pressure sensor.

The flow control valve could also be positioned downstream of the flow restriction and the pressure sensors. In that case, pressure measurement could be by means of the differential pressure sensor and either an upstream or downstream pressure sensor. However, by sensing upstream pressure, an upstream pressure sensor can be shared as in U.S. Pat. No. 10,698,426 and illustrated in FIG. 4. Here, the control valve 407 of each channel 405 is positioned downstream of the restrictor 409. The differential pressure across the restrictor is measured by a differential pressure sensor 408. As before, a common temperature sensor 411 may be shared by all channels or an individual temperature sensor may be positioned on each channel. An absolute pressure sensor 406 might be positioned adjacent to the flow restriction upstream of the flow restriction in each channel. However, to reduce the number of pressure sensors, a single pressure sensor 406 may be shared by all channels as shown in FIG. 4. As in U.S. Pat. No. 10,698,426, the actual pressure adjacent to and immediately upstream of each flow restrictor can be computed through a recursive calculation.

Figure 5A:
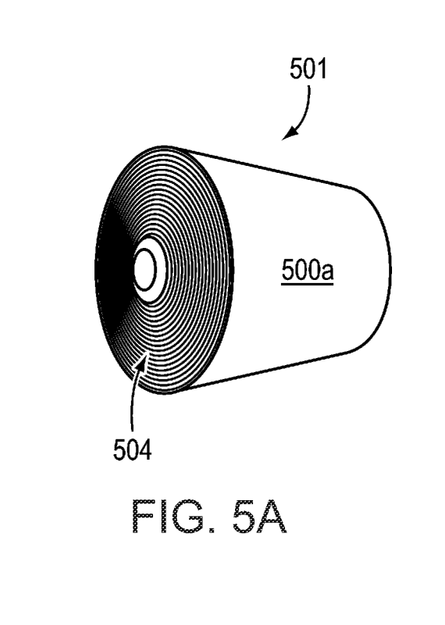
FIGS. 5A-C are diagrams of several laminar flow elements that can be used as pressure drop elements in example embodiments of the invention.
Figure 5B:
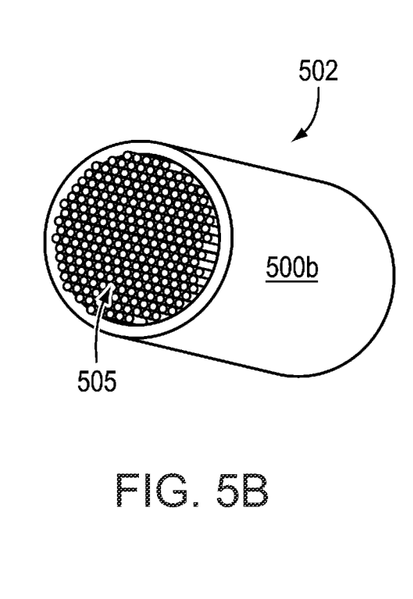
Figure 5C:
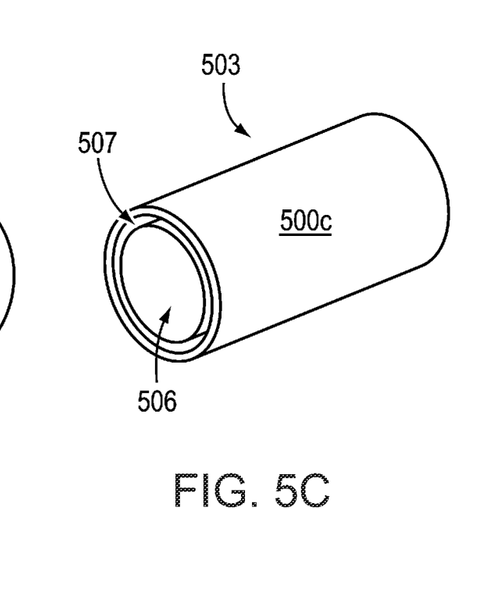

FIGS. 5A-C are diagrams of several laminar flow elements that can be used as pressure drop elements in an embodiment of the invention. Several different types of laminar flow elements can be used as pressure drop elements. Potential types of laminar flow elements include a corrugated laminar flow element 501, bundle tube laminar flow element 502, and annulus laminar flow element 503. Other laminar flow elements include a parallel-plates laminar flow element and a compressed laminar flow element such as a sintered porous metal filters or other porous media. Laminar flow elements are precisely engineered with excellent consistence. Laminar flow elements also retain the relationship between flow, upstream pressure, and downstream pressure even in low pressure ranges. Each laminar flow element includes a surrounding case 500a, 500b, 500c that forces the flow to travel through the interior of the element. The interior of each laminar flow element includes obstruction(s) that induce laminar flow in the fluid traveling through the element. For the corrugated laminar flow element 501, its interior is filled with ridged and grooved layered metal plates 504. For the bundle tube laminar flow element 502, its interior is filled with tubes 505 whose lengths are parallel to the flow direction. For the annulus laminar flow element 503, its interior includes a solid cylinder 506 whose length is parallel to the flow direction that creates a ring-shaped gap 507 between the surrounding case 500c and the central cylinder 506. Any variations and constructions of laminar flow elements, including but not limited to those illustrated in FIG. 5, can be utilized by the invention so long as they are capable of inducing a laminar flow in the secondary flow lines.

For the laminar flow elements, the function $(2P_u-DP)*DP$ has a linear relationship with the flow in the channel. Because of this linear relationship, a flow ratio controller can use the signals that correspond to the pressure measured upstream of laminar flow element and the pressure measured across the laminar flow element to determine and control the ratio of secondary flows of an unknown fluid composed of an unknown gas or gas mixture. The strong linear relationship allows for precise flow ratio measurements and control when using a laminar flow pressure drop element in a flow ratio control as shown in FIG. 3.

Figure 6A:
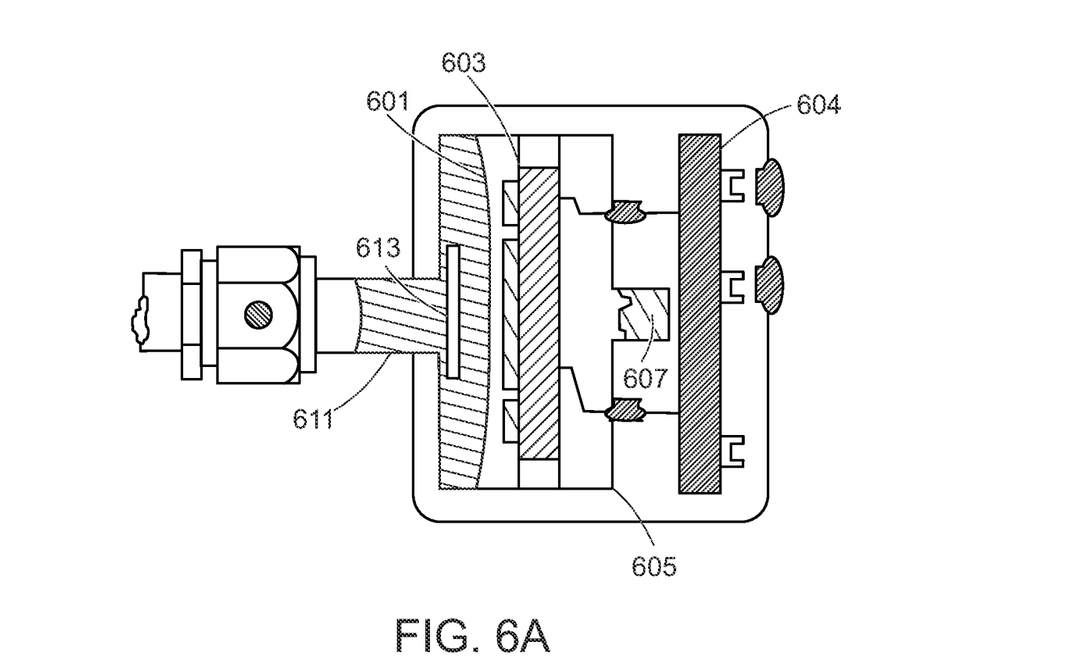
FIGS. 6A and B are cross-sectional views of the absolute pressure sensor and differential pressure sensor, respectively.
Figure 6B:
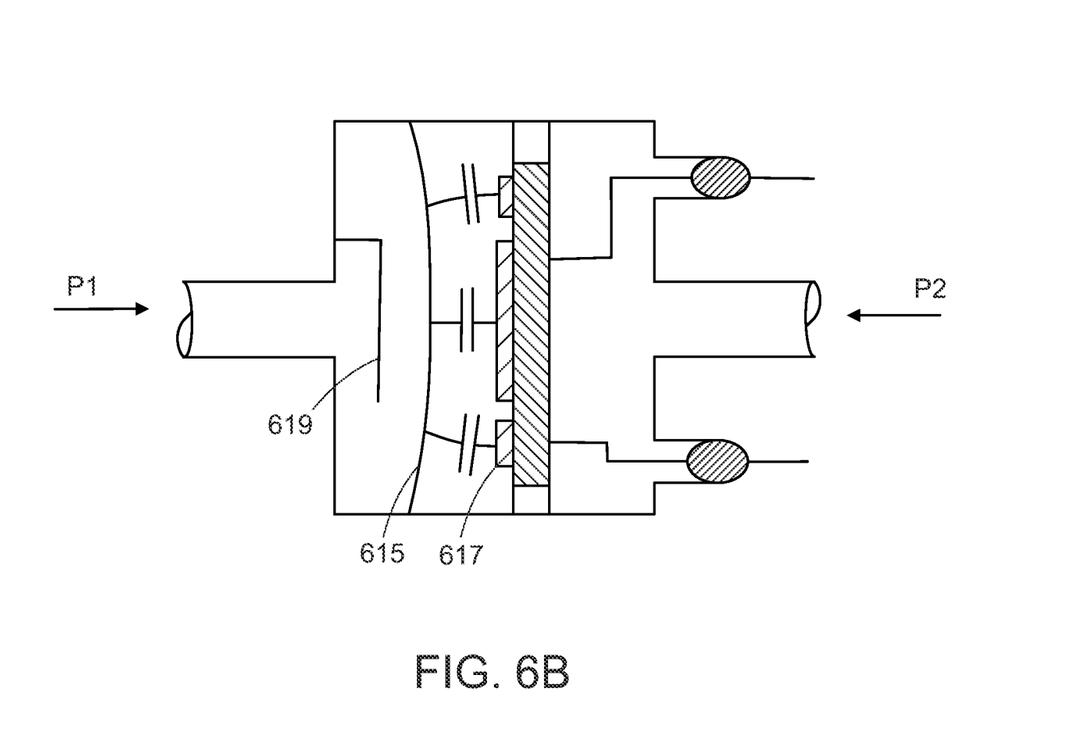

A suitable absolute pressure sensor 306 is an MKS Baratron absolute capacitance manometer, a cross-section of which is shown in FIG. 6A. The sensor capsule contains the diaphragm 601 and the metal-on-ceramic electrode structure 603 coupled to electronics 604. The reference side 605 (backside) of the diaphragm is evacuated to a very high vacuum, much lower than the pressures that are to be measured. The high vacuum on the reference side is maintained over the life of the manometer by means of an internal chemical getter pump 607. The measurement side of the diaphragm 601 is connected to the system through a port 611 across a baffle 613. Pressure is determined by measuring the change in capacitance between the metal diaphragm and an adjacent, fixed dual electrode. A suitable differential pressure sensor is an MKS Baratron differential capacitance manometer, a cross-section of which is shown in FIG. 6B. Pressure is determined by measuring the change in capacitance between the metal sensing diaphragm 615 and an adjacent, fixed dual electrode 617. One side of the sensing diaphragm is connected to the "low pressure port" P2 and the other side of the diaphragm to the "high pressure port" P1 across baffle 619. The diaphragm flexes and is sensed as an electrical signal that is proportional to the difference in the two pressures.

In some embodiments, each secondary flow channel needs to be calibrated in order to provide a flow rate measurement for flow ratio control applications. A calibration gas such as N2 can be used to determine the coefficients of $k(\epsilon, d, L, mw, r, \mu, T)$ in the i-th secondary flow channel (i=1, 2, ... N) for the flow calculation equation:

$$Qi = ki(\epsilon i, di, Li, mw, r, \mu, T) \cdot (2Pui - DPi) \cdot DPi, \text{ or}$$

$$Qi = \vec{Ki} \cdot \vec{Xi}, i = 1, 2, \ldots, N$$

Multiple calibration points of (Pui, DPi, Qi) can be collected for the whole operating range during the calibration process. Additionally, temperature sensors may be used to determine T for the inlet flow and/or the secondary flows. The calibration points can be used to determine the coefficients of $k(\epsilon, d, L, mw, r, \mu, T)$.

An alternative flow calculation method involves constructing a 3D map of the variables Pui, DPi, Qi similar to what is shown in FIG. 3 for each secondary flow channel during the calibration. The flow ratio controller 310, 410 can use the 3D map as a look-up table to determine flow rate Qi based on the measured upstream pressure Pui and the differential pressure DPI for the i-the flow channel. If the inlet gas is an unknown gas, flow ratio controller 300, 400 can treat the inlet gas as a calibration gas (e.g. N2) and use either the calibrated coefficients $ki(\epsilon i, di, Li, mw, r, \mu, T)$ or the 3D maps of (Pui, DPI, Qi) to calculate secondary flow rates $Qi$ as the calibration gas and then the corresponding flow ratios $r_i$. Because the flow $Qi$ in each secondary flow line has a linear relationship with the modified pressure vector $\vec{Xi}$, the corresponding flow ratio $r_i$ is accurate even when the calculated flow rate $Qi$ is based on the calibration gas not the actual gas.

Figure 7:
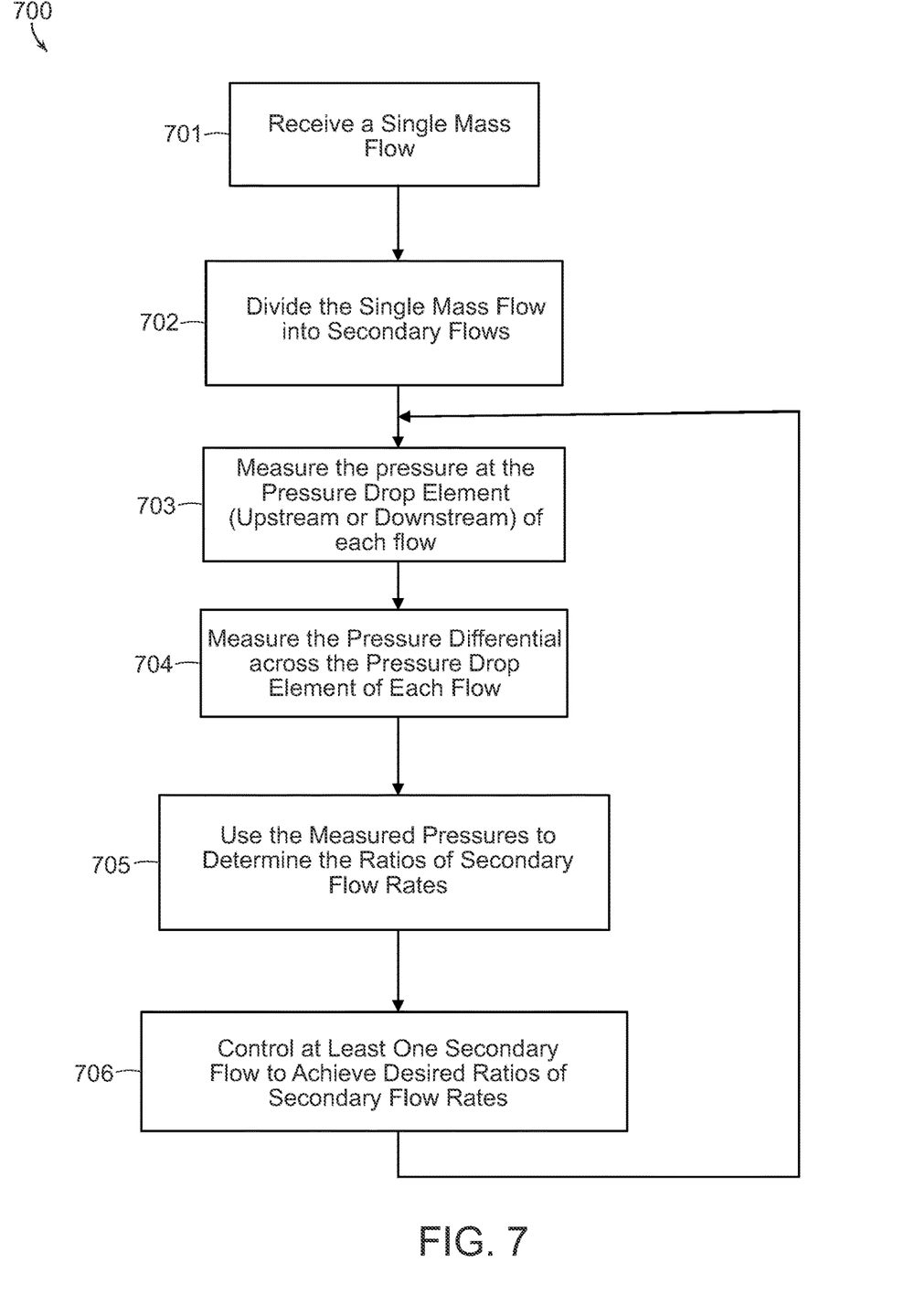
FIG. 7 is a flow chart illustrating an example embodiment of a method for dividing a single mass flow into secondary flows of desired ratios utilizing absolute and differential pressure sensors.

FIG. 7 is a flow chart 700 illustrating an example embodiment of a method for splitting an inlet flow into secondary flows of desired ratios utilizing absolute and differential pressure sensors. The method shown in flow chart 700 can be performed using a flow ratio controller with a pressure drop element, valves, pressure sensors, controller, and other elements configured in the manner illustrated by FIG. 3 and FIG. 4. The first step 701 is to receive an inlet flow at an inlet channel. The fluid comprising the inlet flow, fluid properties, and flow rate within the inlet may be unknown. In the next step 702, the inlet flow is divided into secondary flows. The secondary flows are carried by paths of secondary flow lines connected to the inlet. The secondary flows travel in the secondary flow lines at secondary flows rates. For each secondary flow line, the following steps 703 and 704 are performed. In step 703, a first pressure sensor measures the pressure within the secondary flow line upstream or downstream of a pressure drop element, and in step 704 a differential pressure sensor measures the pressure within the secondary flow line across a pressure drop element.

The next step 705 is performed by a controller. The controller uses the absolute pressures measured and the differential pressures across the pressure drop element to determine the flow rates and the ratios of secondary flow rates. This is possible because, with the laminar flow element within the secondary flow lines channels, the secondary flow rates are linearly related to a function of the absolute and differential pressures, specifically, in one embodiment, to (2Pu–DP)*DP. In the final step 706, the controller calculates and sends control signals to at least one of the valves located on the secondary flow lines to control at least one of the secondary flow rates in the secondary flow lines to obtain specified or desired ratios of secondary flow rates. The controller may use a feedback control algorithm to complete step 706 by looping back to step 703. The control signal controls at least one of the valves dependent upon the determined ratios of secondary flow rates and the desired ratios of secondary flow rates. The method shown in flow chart 700 may be performed continuously during the operation of a flow ratio controller and be used to achieve a sequence of desired ratios of secondary flow rates with extreme accuracy.

Generally, the controller processes the absolute flow ratios $Q_i/Q_t$. However, in the case of only two secondary flows, the controller may process relative flow ratios $Q_1/Q_2$ or $Q_2/Q_1$. In either case the desired ratios of secondary flow rates to total flow rate are obtained.

While example embodiments have been particularly shown and described, it will be understood by those skilled in the art that various changes in form and details may be made therein without departing from the scope of the embodiments encompassed by the appended claims.

What is claimed is:

1. A system for dividing a mass flow into secondary flows comprising:
   an inlet configured to receive an inlet flow;
   secondary flow lines connected to the inlet, each secondary flow line including:
      a flow path configured to carry a secondary flow from the inlet with a secondary flow rate;
      a pressure drop element in the flow path;
      a valve configured to control the secondary flow rate based upon a control signal;
      a pressure sensor upstream of the pressure drop element configured to provide a pressure signal representative of pressure at the pressure drop element; and
      a differential pressure sensing element in communication with pressures upstream and downstream of the pressure drop element and configured to provide a differential pressure signal representative of differential pressure across the pressure drop element; and
   a controller configured to calculate a secondary flow rate of each secondary flow line based upon the pressure signal and the differential pressure signal and further configured to generate the control signal to each valve to obtain a desired ratio of secondary flow rate to total flow rate, wherein the controller is configured to compute and control the ratio of each secondary flow rate according to the relationship, $$r_i = \frac{Q_i}{Q_t} = \frac{Q_i}{\sum_{j=1}^{N} Q_j} = \frac{k_i * (2P_{u,i} - DP_i) * DP_i}{\sum_{j=1}^{N} k_j * (2P_{u,j} - DP_j) * Dp_j}, i = 1, 2, \ldots N.$$

wherein $r_i$ is the ratio between each secondary flow rate Q and the inlet flow rate $Q_t$, k is a constant, $P_u$ is the pressure signal representative of pressure at the pressure drop element, and DP is differential pressure signal representative of differential pressure across the pressure drop element.

2. The system of claim 1 wherein the differential pressure element comprises a diaphragm exposed at one face to the pressure upstream of the pressure drop element and exposed on an opposite face to the pressure downstream of the pressure drop element.

3. The system of claim 1 wherein the pressure sensor is upstream of the pressure drop element and the valve is downstream of the pressure drop element in each secondary flow line.

4. The system of claim 3 wherein the upstream pressure sensor of each flow line is a common pressure sensor shared by all secondary flow lines.

5. The system of claim 1 wherein the valve is positioned upstream of the pressure drop element.

6. The system of claim 5 wherein the pressure sensor is positioned between the valve and the pressure drop element.

7. The system of claim 1 wherein the pressure drop element is configured to create a linear response between the secondary flow rate and a function of the pressure at the pressure drop element and the differential pressure across the pressure drop element.

8. The system of claim 1 wherein the pressure drop element is a laminar flow element.

9. The system of claim 1 further comprising a temperature sensor configured to measure the temperature of the fluid in each secondary flow line.

10. A method of dividing a mass flow into secondary flows of desired ratios comprising:
receiving an inlet flow at an inlet;
dividing the inlet flow into secondary flow lines connected to the inlet, each secondary flow line including:
a flow path configured to carry a secondary flow with a secondary flow rate;
a pressure drop element in the flow path;
a valve configured to control the secondary flow rate based upon a control signal;
a pressure sensor upstream of the pressure drop element configured to provide a pressure signal representative of pressure at the pressure drop element; and
a differential pressure sensing element in communication with pressures upstream and downstream of the pressure drop element and configured to provide a differential pressure signal representative of differential pressure across the pressure drop element; and
determining, by a controller, the secondary flow rate of each secondary flow line based upon the pressure signal and the differential pressure signal; and
by the controller, generating and applying the control signal to each valve to obtain a desired ratio of secondary flow rate to total flow rate, wherein the controller computes and controls the ratio of each secondary flow rate according to the relationship $$r_i = \frac{Q_i}{Q_t} = \frac{Q_i}{\sum_{j=1}^{N} Q_j} = \frac{k_i \cdot (2P_{u,i} - DP_i) \cdot DP_i}{\sum_{j=1}^{N} k_j \cdot (2P_{u,j} - DP_j) \cdot DP_j}, i = 1, 2, \ldots N.$$

wherein $r_i$ is the ratio between each secondary flow rate Q and the inlet flow rate $Q_t$, k is a constant, $P_u$ is the pressure signal representative of pressure at the pressure drop element, and DP is differential pressure signal representative of differential pressure across the pressure drop element.

11. The method of claim 10 wherein the differential pressure element comprises a diaphragm exposed at one face to the pressure upstream of the pressure drop element and exposed on an opposite face to the pressure downstream of the pressure drop element.

12. The method of claim 10 wherein the pressure sensor is upstream of the pressure drop element and the valve is downstream of the pressure drop element in each secondary flow line.

13. The method of claim 12 wherein the upstream pressure sensor of each flow line is a common pressure sensor shared by all secondary flow lines.

14. The method of claim 10 wherein the valve is positioned upstream of the pressure drop element.

15. The method of claim 14 wherein the pressure sensor is positioned between the valve and the pressure drop element.

16. The method of claim 10 wherein the pressure drop element is configured to create a linear response between the secondary flow rate and a function of the pressure at the pressure drop element and the differential pressure across the pressure drop element.

17. The method of claim 10 wherein the pressure drop element is a laminar flow element.

18. The method of claim 10 further comprising measuring the temperature of the fluid in each secondary flow line.

19. A system for dividing a mass flow into secondary flows comprising:
an inlet configured to receive an inlet flow;
secondary flow lines connected to the inlet, each secondary flow line including:
a flow path configured to carry a secondary flow from the inlet with a secondary flow rate;
a pressure drop element in the flow path;
a valve upstream of the pressure drop element configured to control the secondary flow rate based upon a control signal;
a pressure sensor between the valve and the pressure drop element configured to provide a pressure signal representative of pressure at the pressure drop element; and
a differential pressure sensing element in communication with pressures upstream and downstream of the pressure drop element and configured to provide a differential pressure signal representative of differential pressure across the pressure drop element; and
a controller configured to calculate a secondary flow rate of each secondary flow line based upon the pressure signal and the differential pressure signal and further configured to generate the control signal to each valve to obtain a desired ratio of secondary flow rate to total flow rate.

20. A method of dividing a mass flow into secondary flows of desired ratios comprising:
receiving an inlet flow at an inlet;
dividing the inlet flow into secondary flow lines connected to the inlet, each secondary flow line including:
a flow path configured to carry a secondary flow with a secondary flow rate;
a pressure drop element in the flow path;
a valve upstream of the pressure drop element configured to control the secondary flow rate based upon a control signal;
a pressure sensor between the valve and the pressure drop element configured to provide a pressure signal representative of pressure at the pressure drop element; and a differential pressure sensing element in communication with pressures upstream and downstream of the pressure drop element and configured to provide a differential pressure signal representative of differential pressure across the pressure drop element; and determining, by a controller, the secondary flow rate of each secondary flow line based upon the pressure signal and the differential pressure signal; and by the controller, generating and applying the control signal to each valve to obtain a desired ratio of secondary flow rate to total flow rate.

* * * * *